INVENTOR.
ROGER F. WHITE
BY
AGENT

April 13, 1965 R. F. WHITE 3,177,655
ROCKET MOTOR THRUST TERMINATION AND REVERSAL DEVICE
Filed Jan. 24, 1961 2 Sheets-Sheet 2

INVENTOR.
ROGER F. WHITE
BY
AGENT

3,177,655
ROCKET MOTOR THRUST TERMINATION AND REVERSAL DEVICE
Roger F. White, Rutherford, N.J., assignor to Thiokol Chemical Corporation, Bristol, Pa., a corporation of Delaware
Filed Jan. 24, 1961, Ser. No. 84,607
3 Claims. (Cl. 60—35.6)

The present invention relates to rocket motors, particularly those of the solid propellant type. It provides a novel device for stopping combustion in such a rocket motor and creating a thrust in the reverse direction to that normally created by the motor.

It is desirable in the operation of solid propellant rocket motors to be able to stop combustion at any particular time. One way in which this may be accomplished is by suddenly greatly enlarging the combustion chamber volume thus allowing the rocket motor's combustion chamber pressure and temperature to drop below a level where combustion no longer occurs. The present invention has made it possible to make use of this principle by providing novel porting in the combustion chamber wall which can be opened at any time during the operation of the motor upon command of an operator located remotely from the motor itself.

It is also frequently desirable when a rocket motor of this type is shut off to provide a reverse or opposite thrust to act as a braking force for the motor and its attached vehicle. The present invention provides a novel way of creating a reverse thrust effect by causing the residual combustion gases, still flowing briefly after combustion ceases, to be directed from the ports into a curved path aimed substantially in a forward direction opposed to the normal rearward thrust of the motor. An appreciable although brief reverse thrust is created in this manner until the flow has decayed to nothing.

The present invention is useful on rocket motors for missiles, spacecraft and aircraft for shutting off the motor at the will of the operator and to achieve a braking effect.

It is, therefore, an object of the invention to provide a useful and novel device for bringing about termination of combustion of a solid propellant in a solid propellant rocket motor by opening ports through the combustion chamber wall.

It is also an object of the present invention to provide a novel means of both effectuating such termination and reversing the flow of the remaining combustion gases to create a reverse or opposite thrust to that normally produced by the motor.

Figure 1:
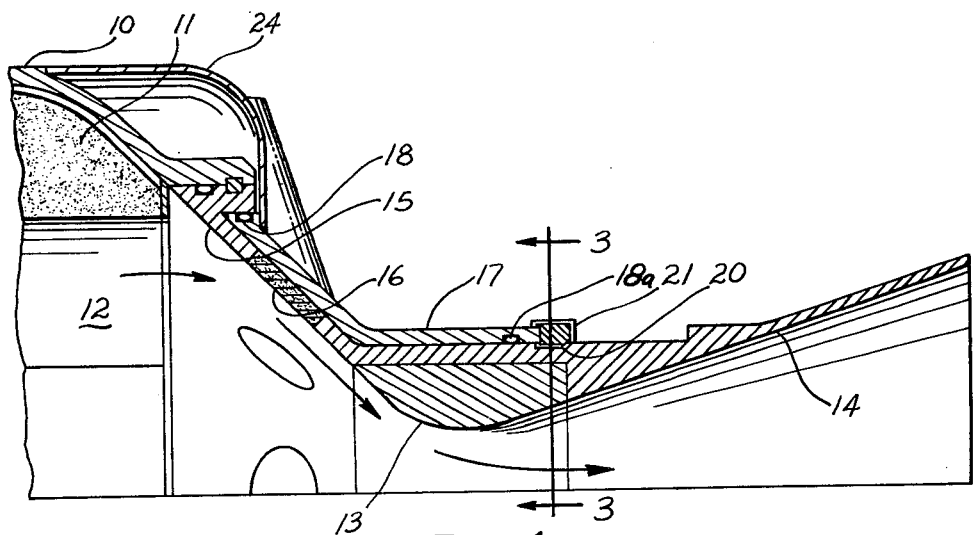
FIGURE 1 is a cutaway partial longitudinal cross-section of the invention showing the cover over and sealing the ports and clamped in place.

In the preferred embodiment of this invention, with particular reference to FIGURE 1, a combustion chamber 10 houses a solid propellant 11 having a central hollow 12. At the after end of the motor at the right in FIGURE 1, a nozzle is attached having a throat or constricted portion 13 and an exit cone or expansion portion 14. Just forward of the throat 13 and between it and solid propellant 11 is a convergent portion 15 serving in effect as an extended part of the wall of combustion chamber 10 and leading into the throat of the nozzle. Ports 16 are located in this wall and extend through it to afford communication between the interior of combustion chamber 10 and central hollow 12 and the exterior of the rocket motor.

Figure 2:
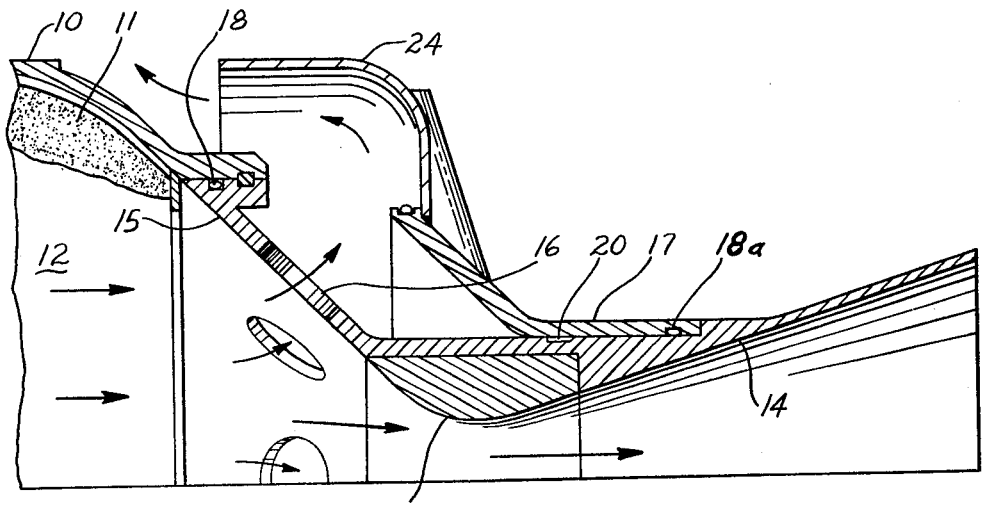
FIGURE 2 is a view similar to FIGURE 1 except that the cover is shown in its operated positon.

The exterior of the nozzle at throat 13 is cylindrical in form. Fitted about this cylindrical portion in a slidable manner is a slide or cover 17 having a flared or frusto-conical portion to the left in FIGURE 1 which seats against and covers ports 16. Seals 18 and 18a are provided at each end of the slide to prevent leakage of combustion gases through ports 16 and the interstices between the cover 17, wall 15 and the wall of throat 13. In addition, ports 16 are filled with a heat-resistant filling material such as an asbestos cement mixture to help seal the ports and to make the inner surface of wall 15 smoother so that streamline flow will be maintained in the port vicinity. The slide or cover 17 is made shorter than the cylindrical outer surface of throat 13 so that cover 17 may slide longitudinally of the rocket motor along the cylindrical surface, and a stop or shoulder is provided on the outer surface of the exit cone 14 to prevent it from travelling too far. FIGURE 2 shows cover 17 in its fully open position against the stop.

Figure 3:
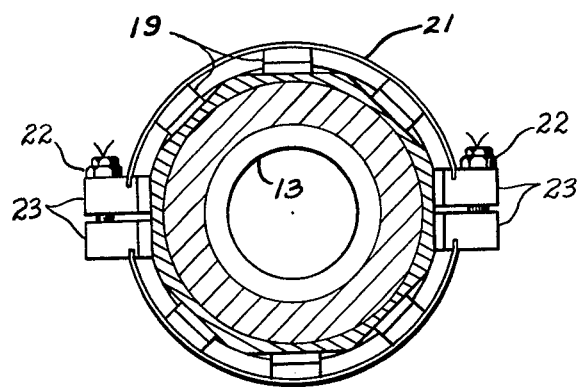
FIGURE 3 is a cross-sectional view to a reduced scale taken along the line 3—3 of FIGURE 1.
Figure 5:
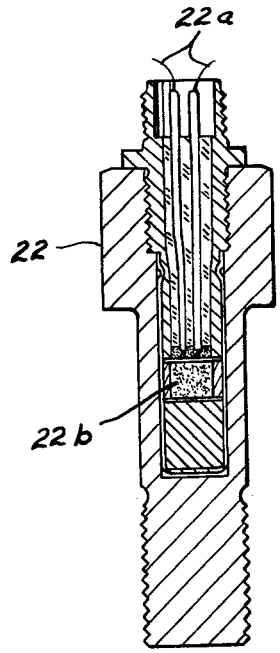
FIGURE 5 is a cross-sectional view to an enlarged scale of an explosive bolt.

In order that the cover 17 may be retained in the closed position as shown in FIGURE 1, a clamp means is provided at the after end of cover 17. This comprises a series of separate keys 19 set in grooves 20 and held tightly in place by spring metal bands 21. The bands 21 are placed in tension by explosive bolts 22 which pass through bosses 23 attached to the ends of bands 21 in the manner shown in FIGURE 3, the inner edges of the bosses 23 serving as keys at the ends of bands 21 and also set in grooves 20 to prevent movement of the bands longitudinally of the motor.

Figure 4:
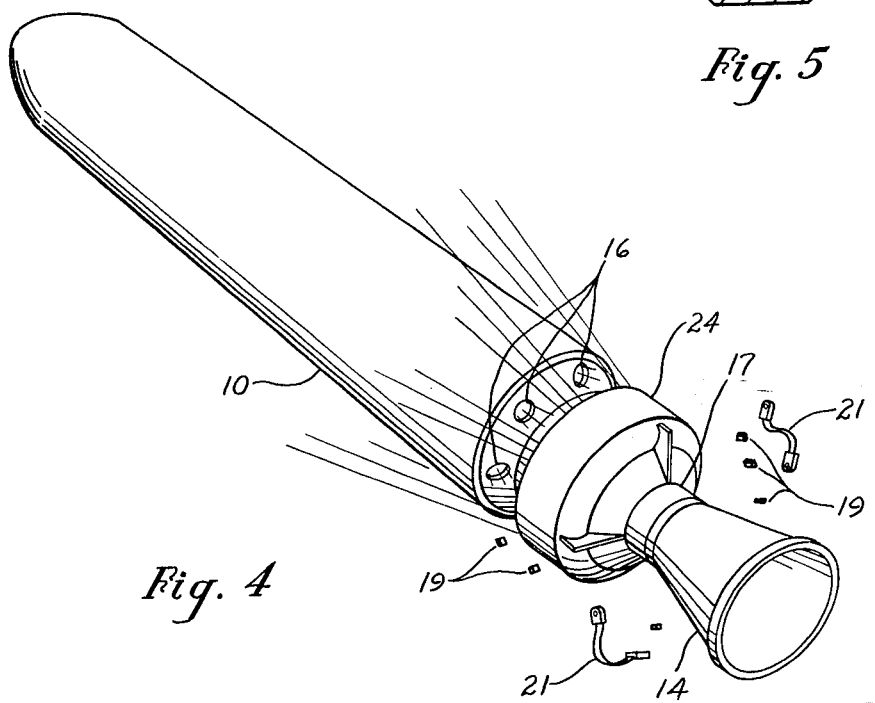
FIGURE 4 is a pictorial view to a reduced scale of a solid propellant rocket motor utilizing the present invention and showing the overall appearance as the ports are uncovered and the clamping means is separated.

In operation, solid propellant 11 is first ignited to start the rocket motor. When it becomes desirable to terminate the combustion within the motor for any reason, an electrical impulse command is transmitted, by known electrical means or by radio or the like, to the wires 22a of the explosive bolts 22 causing the explosive material 22b within the bolts to explode thus fracturing the bolts 22 and releasing the bands 21. Since bands 21 are of spring metal, they spring outward and away from the rocket motor in the manner shown in FIGURE 4 thus releasing the keys 19 from their grooves 20 and allowing them to be forced upward and outward from grooves 20 by the force upon slide 17 exerted by the combustion chamber pressure upon the relatively weak filling material in ports 16 and transferred through it to the flared portion of cover 17. Cover 17 is thus free to slide to the right in FIGURE 1 and does so under this pressure force until it assumes substantially the position shown in FIGURE 2 and uncovers ports 16.

As this occurs, the unsupported filling material is blown out and the combustion gases flow outward from the combustion chamber very rapidly. This action increases the volume of the combustion chamber radically and thus results in a drop in combustion chamber temperature and pressure sufficient to cause termination of combustion of the propellant.

An important combined feature included in the present invention lies in the provision of a thrust deflector 24 attached to cover 17 and curved forwardly with respect to the rocket. As the combustion gases flow outward through ports 16, they are deflected by the thrust deflector 24 into a path which is substantially the reverse of the normal thrust of the rocket motor. This results in a brief opposite or reverse thrust useful for purposes of braking of the vehicle to which the rocket motor is attached.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

What is claimed is:

1. In a rocket motor construction for terminating combustion therein at will, a wall defining the rocket combustion chamber, an outlet port formed in said wall and communicating with the atmosphere, a cover mounted on said wall in a first position and covering said port to permit normal operating combustion pressures within said chamber, said cover being movable in response to said pressures to a second position to uncover said port and lower said pressures to effect termination of combustion in said chamber, a groove formed in said wall adjacent the edge of said cover, a key projecting into said groove and engaging said cover to prevent movement thereof, and a flexible band including an explosive bolt fixed to said key and retaining it in said groove, said bolt being activatable to separate said band and withdraw said key from said groove to permit movement of said cover by said pressures to uncover said port.

2. In a rocket motor construction for terminating combustion therein at will, a wall defining the rocket combustion chamber and terminating in an exhaust nozzle, an outlet port formed in said wall and communicating with the atmosphere, a cover slidably mounted on the exterior of said exhaust nozzle and normally covering said port to permit normal operating combustion pressures within said chamber, stop means formed on the exterior of said nozzle to limit the sliding movement of said cover, a forwardly curved deflector fixed to said cover, said cover being slidably movable in response to said pressures to a position against said stop means to simultaneously uncover said port and position said deflector just aft thereof in the path of flow of combustion gases therefrom, said flow being deflected forwardly by said deflector and simultaneously effecting a forward thrust of the motor and a lowering of said pressures to effect termination of combustion in said chamber, removable means for retaining said cover over said port against said pressures, and means for effecting removal of said last-mentioned means to permit movement of said cover against said stop.

3. In a rocket motor construction for terminating combustion therein at will, a wall defining the rocket combustion chamber and terminating in an exhaust nozzle, an outlet port formed in said wall and communicating with the atmosphere, a cover slidably mounted on the exterior of said exhaust nozzle and normally covering said port to permit normal operating combustion pressures within said chamber, stop means formed on the exterior of said nozzle to limit the sliding movement of said cover, a forwardly curved deflector fixed to said cover, said cover being slidably movable in response to said pressures to a position against said stop means to simultaneously uncover said port and position said deflector just aft thereof in the path of flow of combustion gases therefrom, said flow being deflected forwardly by said deflector and simultaneously effecting a forward thrust of the motor and a lowering of said pressures to effect termination of combustion in said chamber, a groove formed in said wall adjacent the edge of said cover, a key projecting into said groove and engaging said cover to prevent movement thereof, and a flexible band including an explosive bolt fixed to said key and retaining it in said groove, said bolt being activatable to separate said band and withdraw said key from said groove to permit movement of said cover by said pressures to uncover said port.

References Cited by the Examiner

UNITED STATES PATENTS

| | | | |
|---|---|---|---|
| 2,418,488 | 4/47 | Thompson | 60—35.54 |
| 2,481,059 | 9/49 | Africano | 60—35.6 |
| 2,850,976 | 9/58 | Seifert | 60—35.6 |
| 2,871,658 | 2/59 | Keck | 60—35.6 |
| 2,933,889 | 4/60 | Tolkmitt | 60—35.54 |
| 3,011,309 | 12/61 | Carter | 60—35.6 |
| 3,038,303 | 6/62 | Gose | 60—35.54 |
| 3,040,517 | 6/62 | Ryden et al. | 60—35.6 X |
| 3,052,091 | 9/62 | D'Ooge | 60—35.54 |
| 3,065,596 | 11/62 | Schultz | 60—35.6 |
| 3,065,597 | 11/62 | Adamson et al. | 60—35.6 |

FOREIGN PATENTS

| | | |
|---|---|---|
| 860,754 | 12/52 | Germany. |
| 622,348 | 4/49 | Great Britain. |

SAMUEL LEVINE, *Primary Examiner.*

ABRAM BLUM, *Examiner.*